US012775616B2

(12) United States Patent
Ayotte et al.

(10) Patent No.: US 12,775,616 B2
(45) Date of Patent: Oct. 27, 2026

(54) DATABASE INTERACTION AND INTERPRETATION TOOL

(71) Applicant: Siemens Energy Global GmbH & Co. KG, Bayern (DE)

(72) Inventors: John Ayotte, Nykoping (SE); Sebastian-Philipp Brandt, Munich (DE); Davood Naderi, Svärtinge (SE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/775,281

(22) PCT Filed: Nov. 4, 2020

(86) PCT No.: PCT/EP2020/080949
§ 371 (c)(1),
(2) Date: May 7, 2022

(87) PCT Pub. No.: WO2021/094164
PCT Pub. Date: May 20, 2021

(65) Prior Publication Data

US 2022/0398248 A1 Dec. 15, 2022

(30) Foreign Application Priority Data

Nov. 15, 2019 (EP) .................................... 19209415

(51) Int. Cl.
*G06F 16/2453* (2019.01)
*G06F 16/242* (2019.01)
*G06F 16/26* (2019.01)

(52) U.S. Cl.
CPC ...... *G06F 16/24534* (2019.01); *G06F 16/243* (2019.01); *G06F 16/26* (2019.01)

(58) Field of Classification Search
CPC .. G06F 16/24534; G06F 16/243; G06F 16/26; G06F 16/90332; G06F 16/9024
See application file for complete search history.

(56) References Cited

U.S. PATENT DOCUMENTS

2005/0005266 A1* 1/2005 Datig ....................... G06N 5/02 717/136
2012/0002733 A1* 1/2012 Misra ................ H04N 21/4516 375/259
(Continued)

FOREIGN PATENT DOCUMENTS

WO 2016131045 A1 8/2016
WO 2018081633 A1 5/2018

OTHER PUBLICATIONS

PCT International Search Report and Written Opinion of International Searching Authority mailed Dec. 23, 2020 corresponding to PCT International Application No. PCT/EP2020/080949 filed Apr. 11, 2020.

*Primary Examiner* — Aleksandr Kerzhner
*Assistant Examiner* — Aryan D Toughiry
(74) *Attorney, Agent, or Firm* — Wolter Van Dyke Davis, PLLC

(57) ABSTRACT

A method, system, and computer program product for improving the possibilities to retrieve data from a database, includes receiving instructions from a user interface and providing data to the user interface, wherein the database contains a plurality of datasets and a plurality of relationships of the datasets. The database provides a search interface based on graph query language. Data is exchanged by the search interface based on the graph query language. Instructions entered in the user interface being at least partially not in graph query language are processed and/or data retrieved from the database being in graph query language are processed.

20 Claims, 1 Drawing Sheet

(56) References Cited

U.S. PATENT DOCUMENTS

| | | | | |
|---|---|---|---|---|
| 2012/0158791 | A1 | 6/2012 | Kasneci et al. | |
| 2015/0193636 | A1* | 7/2015 | Snelling | G06F 21/6218 726/28 |
| 2016/0132572 | A1 | 5/2016 | Chang et al. | |
| 2016/0239562 | A1 | 8/2016 | Schilder et al. | |
| 2016/0373423 | A1 | 12/2016 | Naibo | |
| 2017/0364539 | A1 | 12/2017 | Jacob et al. | |
| 2018/0121500 | A1* | 5/2018 | Reschke | G06F 16/2428 |
| 2018/0137424 | A1* | 5/2018 | Gabaldon Royval | G06N 5/022 |
| 2018/0210966 | A1 | 7/2018 | Bedi et al. | |
| 2018/0314729 | A9 | 11/2018 | Reschke et al. | |
| 2019/0034780 | A1* | 1/2019 | Marin | G06F 16/3329 |
| 2019/0138648 | A1 | 5/2019 | Gupta et al. | |
| 2019/0317965 | A1 | 10/2019 | Remis et al. | |
| 2020/0012886 | A1* | 1/2020 | Walters | G06F 17/16 |
| 2021/0064679 | A1* | 3/2021 | Zwebner | G06F 16/9535 |
| 2021/0073279 | A1* | 3/2021 | Leite Goldner | G06F 16/287 |
| 2021/0191924 | A1 | 6/2021 | Reschke et al. | |
| 2021/0303601 | A1* | 9/2021 | Yoshitake | G06F 16/367 |

* cited by examiner

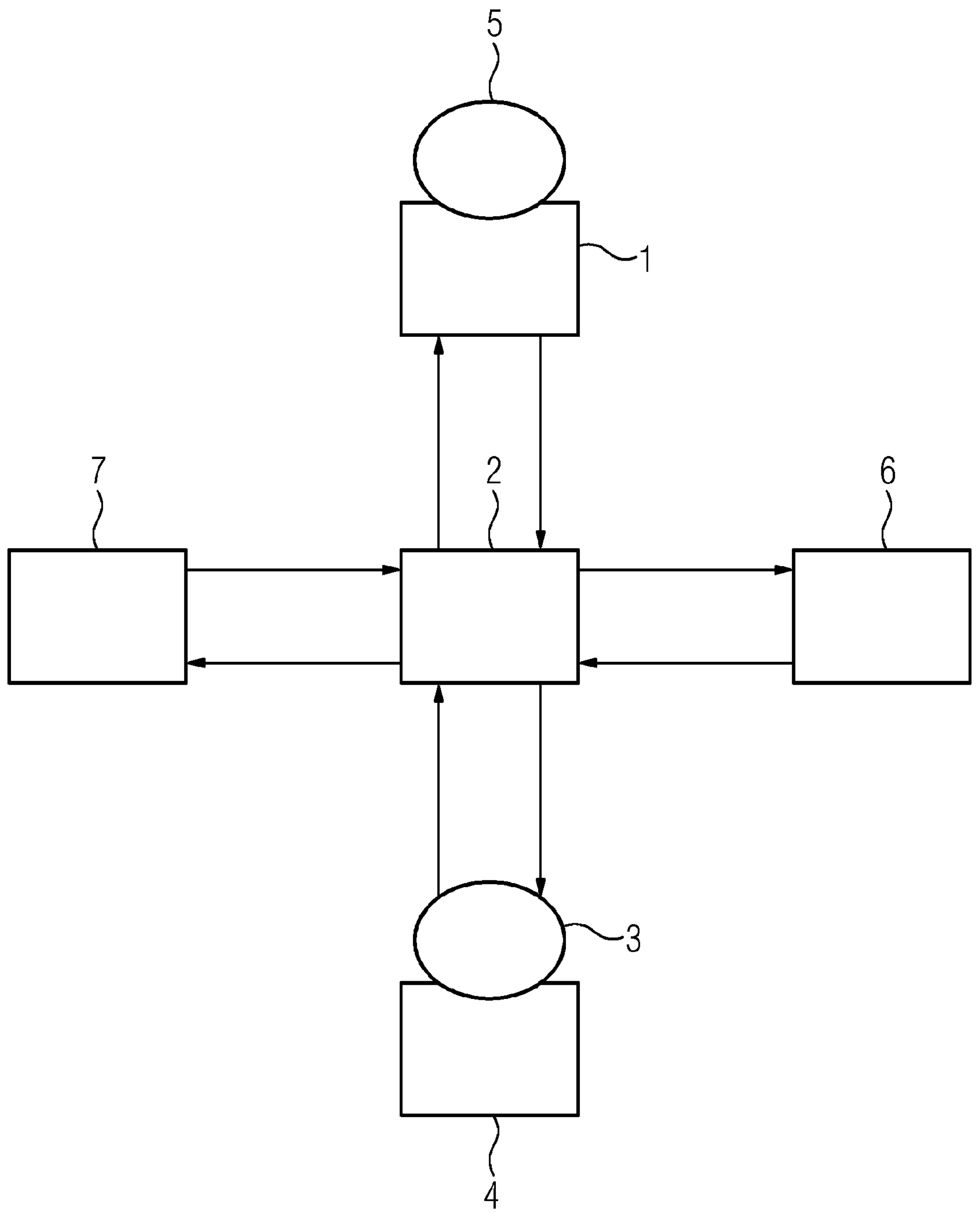
5
1
7
2
6
3
4

DATABASE INTERACTION AND INTERPRETATION TOOL

CROSS REFERENCE TO RELATED APPLICATIONS

This application is the US National Stage of International Application No. PCT/EP2020/080949 filed 4 Nov. 2020, and claims the benefit thereof. The International Application claims the benefit of European Application No. EP19209415 filed 15 Nov. 2019. All of the applications are incorporated by reference herein in their entirety.

FIELD OF INVENTION

The present invention refers to a method improving the possibilities to retrieve data from a database. Furthermore, the present invention refers to a system providing such improved possibilities. Additionally, the present invention refers to a computer program product that allows to realize the inventive method. Furthermore, the present invention refers to the use of the invention to provide improved search strategies within such database.

BACKGROUND OF INVENTION

Acquiring and utilizing data is important since the beginning of natural science. During time data required in the possibilities arising therefrom significantly changed. Simultaneously to the possibilities also requirements and problems to use such data in an efficient way also changed significantly. Taking into account the sheer amount of data that can be collected today and is collected it becomes more and more problematic to make decent use of it. Small amounts of data in the past could be structured and maintained manually. Today not only the size of the data required is far bigger, but it was also noted that is sufficient to include, for example, data regarding typical types of engines like continuous flow engines to make assessments and predictions for the specific different type in question. The whole field of data analytics research areas and evaluation methods has been established and can be made use of to acquire important insight in corresponding subject matter. However, it was noted that the complexity of the data analytics methods requires some technical expert requiring work closely together with an expert in the field of the data analytics to make out use of the new methods available that might be applied to start up data assets currently only used to fraction of its possibilities.

SUMMARY OF INVENTION

This and further problems are solved by the products and methods as disclosed hereafter and in the claims. Further beneficial embodiments are disclosed in the dependent claims and the further description and FIGURES. These benefits can be used to adapt the corresponding solution to specific needs or to solve additional problems.

According to one aspect the present invention refers to a method of providing a search strategy within a database like a knowledge graph, wherein the method contains the steps of receiving instructions from a user interface and providing data to the user interface, wherein the database contains a plurality of datasets and a plurality of relationships of the datasets, wherein the database provides a search interface based on graph query language, wherein the method contains the step of exchanging data by means of the search interface based on graph query language, and wherein the method contains the step of processing instructions entered in the user interface being at least partially not in graph query language and/or processing data retrieved from the database being in graph query language, preferably converting at least a part of the instructions being not in graph query language into graph query language and/or converting at least a part of the data retrieved from the database being in graph query language into a different format.

Surprisingly, it was noted that it is typically highly beneficial to provide such method being computer implemented to simplify the work of the user. While the data in such databases is of great interest and allows to extract highly valuable information it was noted that typically it is very difficult to make use of such data. While graph query language is highly beneficial to extract data from the database it is also very complex and requires the user to be highly skilled in corresponding data analytics related topics. On the other hand it was noted that it is challenging for expert being expert on the technical field relating to the datasets stored in the database to provide the required data for an expert on the field of data analytics to directly provide satisfying search results. Surprisingly, it was noted that the inventive method allows to significantly simplify the work of a technical expert to formulate and customize the search himself making best use of his core competencies. For example, it was noted that for technical fields like the field of continuous flow engines or compressors the technical and experience accumulated on the side of the technical experts is especially required to make good use of the data available in the database. Providing such possibility for such expert significantly improves the workflow and possibilities available. Herein, it is surprisingly simple to automatically process the instructions and the data retrieved from the database utilizing available methods. It was further noted that methods like machine learning are especially suitable to provide a corresponding system. It is assumed that the high consistency of technical experts like in the technical areas of continuous flow engines and compressors to phrase corresponding questions and the typical language and design expected for data received result in the simplified requirements. Thus, it is unexpectedly possible to realize such system despite the problem to be expected to provide such generic “translation”.

Typically, such continuous flow engines utilize a stream of fluid continuously flowing through the engine to rotate a rotor, for example, converting the kinetic energy into electricity. For example, such fluid stream can be generated by means of burning a fuel using burner in a gas turbine or boiling a liquid like water in a steam generator. Examples of corresponding continuous flow engines are gas turbines and steam turbines.

Compressors are utilized to compress a fluid like a gas for it following use. Herein, such compressor is often associated to a fridge being an application of the daily life. However, compressors are also utilized in industrial applications like in the chemical industry to continuously compress a fluid like in a cracking process to allow a further processing.

It has to be noted that the inventive method can contain multiple steps of receiving instructions from the user interface and providing data to the user interface. Typically, it is preferred that an iterative mechanism is utilized especially including data as specified in one or more of the embodiments as mentioned below to give a feedback to the user. In return the user sends comparable instructions or different types of instructions as mentioned in the embodiments below to correct or refine the search strategy. It was noted that technical experts like especially those working on the field of continuous flow engines very efficiently provide reliable search strategies without much effort utilizing the embodiments as described herein.

According to a further aspect the present invention refers to a system comprising a processor and a non-transitory computer readable medium comprising computer executable instructions that when executed by the processor cause the system to perform operations comprising: receiving instructions from a user interface, retrieving data from a database like a knowledge graph by means of a search interface, wherein the database contains a plurality of datasets and a plurality of relationships of the datasets, wherein the search interface is based on graph query language, and wherein the system is adapted to process instructions entered in the user interface being at least partially not in graph query language and/or to process data retrieved from the database being in graph query language, preferably including converting at least a part of the instructions being not in graph query language into graph query language and/or converting at least a part of the data retrieved from the database being in graph query language into a different format. Utilizing such system allows to utilize the inventive method and significantly improves the possibilities of experts being highly skilled in the technical topics yet not in the database related topics.

According to further aspect the present invention refers to a computer program product, tangibly embodied in a machine-readable storage medium, including instructions operable to cause a computing entity to execute an inventive method.

According to further aspect the present invention refers to storage device for providing an inventive computer program product, wherein the device stores the computer program product and/or provides the computer program product for further use.

According to further aspect the present invention refers to a use of an inventive method, an inventive system, or an inventive computer program product to provide a search strategy within a database, wherein the database contains a plurality of datasets and a plurality of relationships of the datasets, and wherein the database provides a search interface based on graph query language.

To simplify understanding of the present invention it is referred to the detailed description hereafter and the FIGURES attached as well as their description. Herein, the FIGURES are to be understood being not limiting the scope of the present invention, but disclosing preferred embodiments explaining the invention further.

BRIEF DESCRIPTION OF THE DRAWINGS

FIG. 1 shows a scheme of an inventive system using an inventive method and an inventive computer program product.

DETAILED DESCRIPTION OF INVENTION

Preferably, the embodiments hereafter contain, unless specified otherwise, at least one processor and/or data storage unit to implement the inventive method.

In the following the invention will be exemplarily refer to continuous flow engines like gas turbines. It was noted that the application of the invention in such area was especially beneficial. It is assumed that this is resulting from, for example, the big amount of data material collected over years and decades as well as the inhomogeneous available data results in significant problems to provide a homogeneous database. Herein, graph query language was found to be surprisingly efficient to formulate search strategies. Simultaneously, it was surprisingly noted that the technical experts of this technical field significantly struggle to utilize such language to formulate search strategies themselves. Herein, it has to be understood that the inventive method is especially beneficially utilized in the aforementioned technical area, however, the application of the inventive method is not limited thereto. A person skilled in the art understands that the basic principle of this invention can be applied to different technical areas. Also, it is expected that taking into account modern data collection in an increasing number of areas similar situations will build up over time and will further increase the benefit obtained by utilizing the inventive method and system in other technical areas. Additionally, it has to be noted that even in case the benefit might be slightly decreased for other technical areas it is still a significant improvement over existing alternatives like building structured databases specifically prepared to be used by technical experts manually.

According to one aspect the present invention refers to a method as described above.

It was noted that it is beneficial for typical embodiments that the datasets and/or relationships contain technical data that is retrieved using the inventive method. According to further embodiments it is preferred that the retrieved data contains technical data. It was noted that it is especially beneficial for typical cases to include specified technical data being directly associated to corresponding datasets and/or relationships. Surprisingly, this allows in combination with the inventive method to enable users providing much experience with regard to the technical subject matter to make use of this know-how without requiring significant knowledge with regard to data analytics. For example, it was noted that such technical data can already be prepared in advance based on typical experiences. Data that might be provided in this context are details with regard to continuous flow engines as utilized in power plants like the type of the continuous flow engine, the power of the corresponding engine, the maintenance state and maintenance schedules related details, and so on. Corresponding data can be extracted or assigned in advance to increase the speed of corresponding search requests.

A type of data that is especially beneficially utilized for the inventive method is time series data. According to further embodiments it preferred that the database contains time series data. Typically, it is preferred that the data provided to the user interface contains times series data. It was noted that corresponding databases containing such time series data representing data collected over years and decades result in amounts of data being even for the same device slightly inhomogeneous based on changes over time. For example, sensors might have been replaced or even the device itself might have been replaced in part or completely. As the collected data often does not reflect corresponding changes data analysts trying to retrieve reasonable data from such data material are confronted with big problems. Therefore, enabling a technical expert being aware of such changes or at least being able to associate a corresponding dataset to such change that might be expected from typical maintenance routines provides a significant benefit. In this context, it is typically preferred that the inventive method optionally includes the step of storing data in the database. Such possibility of storing data in the database using the inventive method is not only beneficial for the embodiment as mentioned above but can be typically beneficially included in all embodiments of the inventive method as described herein. This allows to combine the specific search and introducing further technical information in the database. Such way without requiring additional work for example knowledge of the system collected over years can be easily introduced into the database to allow an even more efficient search in such database subsequently.

It was further noted that it is possible to beneficially implement a summarization method into the inventive method. According to further embodiments it is preferred that the method contains the step of processing at least a part of the database to provide summarized information of the plurality of datasets and/or the plurality of relationships, wherein the data provided to the user interface contains the summarized information. For example, the datasets and/or relationships contained in the database can be summarized according to similar features shared by such datasets and/or relationships. Herein, such shared feature can, for example, be identified automatically, can be provided as instruction received from the user interface or combinations thereof. For example, the datasets can be summarized based on the power output of a turbine engine, wherein the datasets of a specific range of power output are summarized as single set of datasets shown in the user interface. Herein, the user can also be enabled to instruct to further summarize or split up certain sets of datasets to, for example, split such set of datasets based on the type of the turbine engine, summarize different ranges of power output or summarize certain sets of datasets to a bigger set of datasets based on his experience of comparable data. The summarized information can be provided as clustering based on shared features to summarize corresponding datasets and/or relationships to simplify the understanding of the content of the database.

It was noted that it is for typical cases very beneficial to provide a set of filters options for the user. According to further embodiments it is preferred that the data provided to the user interface contains a plurality of filters options relating to the datasets and/or the relationships to the user interface, wherein preferably the filter options contain at least one filter option based on a continuous flow engine like a type of continuous flow engine. For example, such type of continuous flow engine can be a based on a power level provided herewith clustering the available continuous flow engines like continuous flow engines providing a power output between 400 MW and 500 MW. However, it can also be preferred to filter according to the specific model of the continuous flow engine like SGT-800 or SGT-400. Surprisingly, even simple filter options provide a significant benefit, not only resulting from the filter option itself. In general, such filter option as disclosed herein is not necessarily a simple option to be selected but can also be provided as search string or search text optionally containing an explanation. For example, it is also possible to provide a natural language search text representing the filter option. During tests it was noted that the technical experts can use such available filter options to get an idea what possibly might be searched and may utilize a text search like even a natural language based text search to optimize the search strategy using a similar wording. Thus, corresponding filter options provided a surprising guidance for users going beyond the mere filter option possibility provided.

For example, the datasets can be filtered to provide datasets referring to a specific type of continuous flow engine. The corresponding datasets can be shown or reviewed in the user interface. Also, it can be possible to review the search strategy based on the filtered datasets. For example, it can be utilized to assess whether certain relevant datasets are correctly utilized in the search strategy. For example, an user being an expert for such continuous flow engines can assess whether excluded datasets have been correctly excluded or whether similar types should be included again. Additionally or alternatively the user is able to search for datasets related to specific continuous flow engines like specific types of continuous flow engines to review whether incorrect data has been utilized in the search strategy. For example, the user can easily identify and exclude corresponding datasets that might be relevant in general but are not relevant for the specific search strategy.

Also, the inventive method can be beneficially utilized to retrieve specific information from the database. According to further embodiments it is preferred that the retrieved data contains data regarding the database, wherein the retrieved data preferably contains data regarding the datasets like nodes, the relationships, quantifiers, instant counts, hierarchies, epistemic concepts, and/or instances in the database. For example, such quantifier can indicate whether the strategy includes that certain datasets are more heavily influencing the search result than other datasets. Utilizing the inventive method to retrieve the corresponding data from the database was surprisingly beneficial despite being a data analytics topic that should be expected to be detrimental to the interest of the technical user being the target group. However, it was noted that including such feature surprisingly allows to easily collect the corresponding data from the database during the work of the technical expert allowing an expert for data analytics in a subsequent step to review the corresponding search strategy, its customizations and its results. Herein, it is not even required that the corresponding data is visible for the user being a technical expert but might be stored along the other data resulting out of the method. Also, it was noted that corresponding data regarding such correlation of customizations of the search strategy and the associated database related components allows to further optimize and adapt a correspondingly utilized system according to the very specific case with far less effort.

Additionally, it was noted that the method is typically beneficially containing the step of creating or customizing the search strategy. According to further embodiments it is preferred that the method contains the step of executing computer-executable instructions that when executed cause one or more processors to create a search strategy or customize a search strategy to be performed within the database, wherein search results and/or stages of the search and/or attributes of individual result instances are displayed and/or stored. It was further noted that for some embodiments it is typically preferred that the method also contains the step of starting the search based on the search strategy within the database. For typical cases it was noted that this results in a faster and more efficient system.

For example, it can especially be preferred that data provided to the user interface contains a search strategy to be executed within the database, wherein the method contains the step of receiving instructions from the user interface to customize the search strategy, wherein optionally the method contains the step of providing filters options and data regarding the datasets and/or the relationships to the user interface to be utilized for preparing the instructions. Typically, it is preferred that the method contains the step of automatically providing a selection of corresponding filter options and data regarding the datasets and/or the relationships to the user interface, preferably the selection is based an automatic selection depending on the specific search strategy. Such automatic selection can, for example, be based on similar searches performed before and stored in a memory being part of a system utilized to execute the method or being accessible by such system.

Quite surprising it was noted that based on the easy to understand inventive method technical experts quickly grow accustomed to certain data analytics topics. According to further embodiments it is preferred that the data provided to the user interface contains data regarding the creation and/or modeling effort to the user interface. Corresponding information are easily evaluated after short time even by technical experts not being accustomed to corresponding data analytics to this point and allow them to, for example, easier evaluate the quality of the corresponding datasets and/or relationships to even more improve the benefit obtained by the inventive method.

Furthermore, it was noted that it was especially helpful to structure the search strategy into subparts. According to further embodiments it is preferred that the search strategy consists of at least two, preferably a plurality, of sub search strategies being executed linearly or parallelly, wherein executing the at least two sub search strategies equals executing the search strategy, wherein the data provided to the user interface contains data regarding at least one sub search strategy, and wherein the method contains the step of receiving instructions regarding the customization or replacement of the sub search strategies from the user interface. Surprisingly, it was noted that this step requiring additional effort provides significant benefits for typical cases allowing to more easily process parts of the search strategy. It was noted that evaluating and providing instructions for such smaller parts of the overall search strategy significantly decreases the effort required by the user being technical experts. For example, the sub search strategies are preferably customizable according to the datasets selected during the search. Herein, it is preferred for typical embodiments that it is not only possible to select or deselect datasets, groups of datasets and/or types of datasets, but it is also possible to include quantifiers relating to the datasets. Such quantifier allows to influence the weight of the datasets for the search strategy.

A further beneficial feature that can be implemented is the possibility that the user can be enabled to directly select certain results to be retrieved and shown on the user interface. According to further embodiments it is preferred that the instructions contain a selection of a partial search result and/or a preliminary search result, wherein the data provided to the user interface contains the partial search result and/or the preliminary search result, and wherein the method contains the step of customizing the search strategy using instructions from the user interface in response to the partial search result and/or preliminary search result, wherein optionally the instructions utilized for customizing are at least in part converted into graph query language. Surprisingly, it was noted that the experts utilizing the data structure product efficiently utilize corresponding search results the countercheck and improve the search strategy.

Furthermore, it was noted that in typical embodiments including a quality identifier significantly simplifies the reviewing process for technical experts. According to further embodiments it is preferred that the data provided to the user interface contains a quality identifier for at least one dataset and/or at least one relationship. While experts for data analytics topics can typically easily evaluate the quality of such dataset or relationship on demand, it was noted that a technical expert benefits significantly from such additional information. Such quality identifier can be provided in different forms like a ranking system with a number assigned to it like ranging from 1 to 10 or some ample system indicating, for example, datasets with low reliability by red and datasets with the high reliability by green. Further methods to provide such quality identifier available to persons skilled in the art and can be easily implemented to realize this embodiment of the invention.

For typical embodiments it is very efficient for the user to customize the search strategy by means of including quantifiers. According to further embodiments it is preferred that the method contains the steps of: —automatically providing a search strategy, wherein at least one quantifier is assigned to at least one dataset and/or at least one relationship, —automatically excluding datasets and/or relationships providing a low quantifier from the search, —providing data to the user interface containing data regarding the quantifier and/or excluded datasets and/or relationships to the user interface, preferably data regarding the quantifier and datasets and/or relationships that have been excluded. Typically, it is preferred that the method further contains the step of customizing at least one quantifier and/or include at least one datasets and/or at least one relationship. Additionally or alternatively the instructions contain instructions influencing a threshold specifying what quantifier is required to exclude or include datasets and/or relationships in the search. This allows to introduce significant customizations of the search strategy in an easy to understandable way making best use of the technical know-how of experts. For example, this allows the knowledge of such experts what types of continuous flow engines provide a comparable behavior or what situations during the use of corresponding continuous flow engines are comparable to the situation being topic of the search.

A beneficial feature to be in typical applications beneficially included in the user interface allows the user to utilize natural language. According to further embodiments it is preferred that the instructions received from the user interface contain instructions from a natural language interface. A corresponding loss of accuracy is surprisingly more than compensated for typical applications by the simplification for the user being no data analytics expert. Such interface can be utilized also in combination with suggested filter options. This combination was especially useful for many applications, as it suggests certain formulations and even different filter options entered using similar natural language can more easily be interpreted to relate to the correct terms increasing the quality of the output.

Additionally, it is beneficial for specific embodiments that a natural language input is utilized to identify relevant datasets or relationships. According to further embodiments it is preferred that the method contains the steps of: interpreting natural language to identify potentially relevant datasets and/or relationships entered in natural language in the user interface, and providing data containing the potentially relevant datasets and/or relationships and/or selected data like technical data of potentially relevant datasets and/or relationships to the user interface. Typically, it is preferred that corresponding data provided to the user interface is provided in a structured and/or grouped form. For example, it can be structured according to the quantifier or quality identifier of corresponding datasets and/or relationships. Additionally or alternatively the corresponding data can be grouped according to certain technical aspects like a certain type of continuous flow engine. For example, it was noted that it especially beneficial to group the corresponding data according to the type of continuous flow engine being the source of the corresponding dataset and structure the data according to the quality of the data available. This, for example, enables an user being an expert of continuous flow engines to easily select relevant data originating from similar continuous flow engines having a high quality to be included in the search strategy and optimize the results significantly.

Further experiences showed that it can be beneficial for typical applications that the inventive method includes utilizing of a data storage containing data regarding prior searches.

According to further embodiments it is preferred that the method contains the steps of: —providing a data storage containing data regarding prior searches and prior search strategies, —manually, semiautomatically, or automatically compare a new search to the prior searches, and —creating a new search strategy or adapting a new search strategy based on prior search strategies regarding similar prior searches. Identifying and qualifying such similarity can be realized using typical methods. Herein, it can be relied upon "simple" methods like comparing the type of device like the type of continuous flow engine. However, for other embodiments it is preferred that alternatively or additionally a similarity search is based on machine learning like deep learning. The correspondingly identified data regarding prior searches can, for example, be automatically utilized to optimize the search strategy provided to the user interface. Alternatively, the data provided to the user interface first contains a selection of possibly relevant prior searches and/or a suggestion of a similar prior search, wherein the instructions received by the user interface contain instructions verifying such suggestion and/or selecting at least one possibly relevant prior search from the selection. For typical embodiments it is preferred that the method contains at least a verification step to provide a suggestion of possibly included data regarding prior searches and/or prior search strategies to a user being able to decide upon such inclusion. For example, such decision can be in the form of a yes/no decision. Typically, it is preferred that a corresponding suggestion is accompanied by technical aspects being included in the prior searches. For example, the type and/or power output of a corresponding continuous flow engine can be provided to a user interface to enable a user being expert in the field of continuous flow engines to easily evaluate the relevance of corresponding prior searches. Typically, it is preferred that the system also enables the user to request additional information with regard to the suggested data to be included. This allows to simplify the decision of the expert.

According to further embodiments it is preferred that the method contains the step of assigning at least one quantifier to a dataset and/or a relationship, and wherein a partial search result, a step of the search result, a preliminary search result and/or a search result is provided based on the at least one assigned quantifier. For typical embodiments it is preferred that the instructions received from the user interface contain instructions to assign at least one quantifier. Herein, assigning such quantifier also includes instructing to amend an existing quantifier. Furthermore, it is preferred that data provided to the user interface contains at least one of the aforementioned results. This enables the user to, for example, directly review the consequences of a corresponding quantifier and compare it to the expectations. Typically, it is beneficial for many embodiments that the partial search result, the step of the search result and/or the preliminary search result contain data with regard to the changes resulting from including the quantifier. Herein, it is possible to, for example, include the changes of corresponding values as percentages or absolute number possibly including a ranking according to the size of the change and/or provide a selection of the most significant changes being selected, for example, based on a threshold value.

A feature that is beneficially included for typical embodiments it is a report feature. According to further embodiments it is preferred that the method contains the step of providing a report of the search strategy, search result, partial search result, a step of the search result, and/or a preliminary search result, more preferred of the search strategy and/or search result. Although, it is typically preferred that in the first step that such report is provided to the user by means of the user interface, it is typically beneficially to provide the report in a generic form easily accessible and distributable. For example, it may be exported as CSV or PDF file. Herein, it can be preferred to directly provide an interface to send the corresponding report utilizing a network like an internal network or the internet. For example, it can be sent directly to the service center utilizing the Internet. In case of a transmission utilizing an insecure network it is typically preferred to include an encryption mechanism. Although, it is possible to directly transmit data utilizing mechanisms like VPN it was surprisingly beneficial to include such encryption being especially preferable automatically implemented to prevent a data loss in case of some malfunction combined with an automated sending of the corresponding data.

A technical area benefitting significantly from the present invention is the technical area of industrial plants like chemical plants and power plants, continuous flow engines and compressors. According to further embodiments it is preferred that the datasets contain data regarding industrial plants, continuous flow engines and/or compressors, more preferred continuous flow engines and/or compressors, even more preferred continuous flow engines. The data collected over decades for corresponding systems is very beneficially utilized using the inventive data structure product. Also, the technical experts working in this technical area are typically not that well accustomed with details of data analytic topics. Simultaneously, corresponding technical experts are typically highly skilled and experienced with regard to the systems and requirements within their technical field while simultaneously corresponding detailed information regarding such data is typically not contained in such databases.

While it is possible to completely automate the process to provide a search strategy and perform such search it is beneficial for typical embodiments to include at least one review step. According to further embodiments it is preferred that the method contains the steps of: providing data regarding the plurality of datasets and/or the plurality of relationships to the user interface at least once, and receiving at least one instruction containing a verification that a user agrees to the search strategy and optionally containing customizations of the search strategy. Typically, it is preferred that the data regarding the plurality of datasets and/or the plurality of relationships refers to technical data in relationship to the data contained in the plurality of datasets and/or plurality of relationships. It was noted that even a quick review utilizing the user interface significantly improves the overall benefit of corresponding searches. Making this review process faster and simpler while making it mandatory surprisingly provided the overall benefit that the implementation is far more efficient.

According to further embodiments it is preferred that the method contains the steps of: —providing data to the user interface, wherein the data contains a plurality of filter options, —receiving instructions from the user interface, wherein the instructions contain a selection of at least one filter option, and—providing data to the user interface, wherein the data provided to the user interface contains filtered datasets and/or filtered relationships and/or data referring to filtered datasets and/or data referring to filtered relationships based on the selection, and/or the filtered datasets and/or the filtered relationships are utilized to provide a partial search result, a preliminary search result and/or the search result, more preferred wherein the data provided to the user interface contains filtered datasets and/or filtered relationships and/or data referring to filtered datasets and/or data referring to filtered relationships based on the selection. Typically, it is preferred that the filter options are predefined filter options. Providing such plurality of predefined filter options further improve the benefit obtained utilizing the inventive method. Despite the high speed of modern processors and large size of working memory the mass of data as available in, for example, the field of continuous flow engines is a challenging task. Providing some predefined filter options allowing to already structure and search this mass of data in advance allows to significantly increase the speed to provide some partial search result and/or preliminary search result. This is of special importance for the inventive method, as it has been noted that technical experts confronted with corresponding data analysis do not intend to wait too long for corresponding result to be shown in the user interface. As such result is also in many cases utilized to further optimize the search strategy increasing the speed even a little, thus, significantly improve the value of the corresponding method.

Also, it was noted that it is typically beneficial to provide an improved user interface with the possibility to show more and especially detailed information regarding technical aspects. According to further embodiments it is preferred that the method contains the step of visualizing technical data regarding the datasets and/or the relationships in the user interface. Surprisingly, such apparently simple and trivial amendment significantly increases the acceptance as well as quality of the input by users being technical experts. It is assumed that a different mindset expects more technical info related information as well as FIGURES to be reviewed and meeting this demand significantly increases the acceptance rate as well as possibility to quickly evaluate the corresponding matter contrary to what is typically requested in the art.

Furthermore, it was noted that it is beneficial for typical applications like in the area of continuous flow engines that the data provided to the user interface contains non-language representations of the content of the database. According to further embodiments it is preferred that the method contains the step of processing at least a part of the plurality of datasets and/or the plurality of relationships, more preferred the plurality of datasets and/or the plurality of relationships, of the database to provide a non-language representation of the at least part of the data to the user interface, wherein the non-language representation is provided to the user interface, wherein the instructions are at least in part, more preferred completely, based on the non-language representation of data of the database. For example, such non-language representation can be a diagram or scheme. This allows to provide an easy to understand overview of the content showing, for example, core datasets being linked to a big number of other datasets by means of relationships. The user might also select a certain type of dataset and/or relationship to highlight identical or similar data. Herein, such highlighted data can be in the non-language representation or in natural language data or graphic language data provided to the user interface. For example, the user might select a type of dataset in the non-language representation resulting in highlighting the corresponding element in graph query language in a suggested search strategy and an explanation additionally provided in natural language.

Typically, it is preferred that at least a part of the datasets and at least a part of the relationships of such non-language representation are summarized to groups of similar datasets and/or similar relationships and/or datasets sharing at least one specific feature and/or relationships sharing at least one specific feature. This allows to significantly simplify the data of the database and enables users being no experts of the data analytic field to understand the content of the database and to select datasets and/or relationships being, for example, point of interest or less interesting.

The inventive method can, for example, be especially usefully utilized to review maintenance requirements of continuous flow engines and compressors. According to further embodiments it is preferred that the inventive method is used for determining future maintenance intervals of continuous flow engines like gas turbines and steam turbines or compressors, more preferred of continuous flow engines like gas turbines and steam turbines, even more preferred gas turbines.

Furthermore, it was noted that it is beneficial for typical embodiments to include a feedback possibility for the user being a technical expert to more easily evaluate the impact of customizations entered. According to further embodiments it is preferred that the method contains the steps of: —receiving instructions from the user interface, wherein the instructions contain a customization of the search strategy, and —providing data to the user interface, wherein the data contains an information with regard to a change resulting from the customization. For example, it can be adapted to provide a feedback indicating a significant change resulting from the customization to indicate incorrect customizations that might be reviewed. Additionally or alternatively it can, for example, give a feedback indicating that only a very small change results from the customization. This is surprisingly especially interesting for typical embodiments, as it gives a feedback to the user that a certain point is reached, wherein further customizations like quantifiers to be added or datasets to be excluded or included do not provide a significant improvement anymore. It was noted that such data is highly beneficial for technical experts to prevent wasting too much time optimizing some already satisfying result. Also, such feedback directly indicates in case some grave mistake has taken place and the search strategy significantly deviates from the intended purpose. Surprisingly, this enables even unexperienced users being no experts in the data analytics topic to easily prevent to waste too much time and instead in such case, for example, contact some expert with regard to data analytics to clarify the point.

A further feature significantly improving the comfort for the user utilizing a learning mechanism. According to further embodiments it is preferred that the method contains utilizing the results of a learning mechanism based on prior searches to optimize suggestions for a search strategy, filter options and/or potentially relevant datasets and/or relationships. Utilizing such system allows to significantly increase the quality of corresponding suggestion reducing the effort required by the user. For example, applying it to the field of continuous flow engines is especially useful and provides surprisingly good results.

A further problem is the different terminology used by different experts. According to further embodiments it is preferred that the method contains the step of utilizing an internal dictionary for interpreting instructions received by the user interface, wherein the internal dictionary is adapted to translate terminology utilized by technical users using the user interface. It was noted that a corresponding dictionary can easily be built by collecting corresponding instructions over time combined with the intended customization that is verified in the end.

For technical fields like continuous flow engines providing data originating from different sources and not necessarily including all information with regard to minor differences it was further noted to utilize an accuracy dataset. According to further embodiments it is preferred that the method utilizes an accuracy dataset, wherein the accuracy dataset is calculated by measuring a difference between values of a technical device being topic of the search and corresponding values of comparable technical devices contained in the datasets, wherein the data provided to the user interface contains such accuracy dataset and/or the accuracy dataset is utilized to provide suggestions of potentially relevant datasets and/or relationships. For example, such accuracy dataset can be based on a combination of the model of the continuous flow engine and its power to allow a quick evaluation whether corresponding datasets refer to a first generation continuous flow engine or a retrofitted modernized version making the data potentially less comparable. This allows to prepare additional data in advance that can be easily reviewed and surprisingly allows a very fast first evaluation of potentially relevant matter. However, it has to be understood that corresponding accuracy datasets may differ depending in the corresponding search as, for example, specific aspects might still be maintained during an overhaul.

For example, for users having completely no experience it was further highly beneficial to already provide suggestions regarding the available filter options. According to further embodiments it is preferred that the method contains the data provided to the user interface contains suggestions regarding available filter options. It was noted that providing corresponding suggestions significantly decreases the effort required by corresponding users.

Utilizing the inventive method furthermore significantly simplifies the introduction of datasets originating from different sources. According to further embodiments it is preferred that the database contains at least two datasets from different sources. For example, it was noted that it is highly beneficial to provide datasets referring to different types of continuous flow engines or compressors, preferably continuous flow engines. Providing such structured datasets, for example, provides the benefit that technical experts reviewing corresponding data can easily differentiate whether the search relates to a component being relevant to such different types of continuous flow engines and whether it is beneficial to include corresponding datasets or not. For many embodiments it is especially preferred that the database contains a plurality of datasets from different types and/or models of continuous flow engines.

According to further embodiments it is preferred that the plurality of datasets at least in part contain historical data like time series data of continuous flow engines. It was noted that the inventive method is especially suited to process corresponding databases.

According to further embodiments it is preferred that the database is a knowledge graph. A knowledge graph is also known as heterogeneous data network. Typically, it contains a plurality of data in the form of datasets regarding different technical devices like different types of continuous flow engines and/or data regarding the same technical device yet referring to different aspects and/or sources of the data. Furthermore, it contains data regarding the relationships of the corresponding data. For example, it may contain data regarding different types of continuous flow engines. Herein, it contains data regarding the rotor, the blades and vanes, the cooling, the manufacturing, the use, the lifetime, the maintenance, and so on. Data sets regarding the manufacturing of the components are connected to the datasets regarding the component itself by a manufacturing relationship. Furthermore, they can be connected to a plurality of datasets regarding the lifetime and maintenance in different types of continuous flow engines including a corresponding relationship for each connection. Additionally, the components can be connected to datasets regarding different types of continuous flow engines containing the corresponding component. Also it can be connected to the real use of the continuous flow engine and sensor data indication the wear out. Corresponding databases already existing are easily connected to be utilized in the inventive method. Furthermore, corresponding databases are a good starting point to introduce, for example, features as described herein to further improve the possibilities of making good use of the data and, for example, allow a more reliable prediction of the behavior of the continuous flow engine.

According to further embodiments it is preferred that the knowledge graph contains nodes, and wherein the method provides a partial search result and/or a preliminary such result based on a node selected by user. Typically, such selection is realized by means of a user interface allowing to customize the search strategy as well as displaying data regarding the database, preferably technical data relating to the datasets and/or relationships.

According to further embodiments it is preferred that the knowledge graph contains nodes, wherein the instructions received by the user interface are utilized to define nodes of interest. Relying on the existing nodes of such knowledge graph databases surprisingly simplified to implement the search and data retrieval technologies of the data structure product as described herein.

According to further embodiments it is preferred that the knowledge graph contains nodes, wherein the data provided to the user interface specifies potential nodes of interest and/or contains data regarding the potential nodes of interest. Providing such information automatically significantly increases the speed and decreases the effort required to utilize the inventive method for typical cases. For example, such nodes of interest can be identified based on historical search data reviewing past searches and customizations entered by users. Additionally or alternatively corresponding suggestions can also be based on data available in the database. Herein, an identification of corresponding suggestions can, for example, be based on technical aspects included in the search and reviewing the database whether corresponding technical aspects are present in further datasets to be provided to the user interface. For example, the search might relate to a rotor of a continuous flow engine, wherein the database contains data that the same type of rotor is introduced in alternative types of continuous flow engines. Accordingly, corresponding datasets relating to the other types of continuous flow engines can be provided as suggestions, although, the original search referred to one specific type of continuous flow engine.

According to further embodiments it is preferred that the data provided to the user interface contains suggestions of customizations of the search strategy. Such suggestions can, for example, be provided using machine learning using like deep learning. Corresponding machine learning systems utilizing artificial intelligence and deep learning using deep neural networks are known to the skilled person and implementing such known systems provides surprising beneficial results not to be expected. Instead of or in addition to such machine learning it is, for example, possible to utilize statistical methods. Herein, data regarding prior searches are utilized to provide suggestions based on, for example, customizations of similar searches entered by a user in the past. It was noted that correspondingly provided suggestions fulfill the required reliability as well as significantly decrease the effort required by the user.

According to further embodiments it is preferred that the data provided to the user interface contains data regarding suggested customizations of the search strategy like quantifiers with regard to datasets and/or relationships and data regarding the impact of corresponding customizations. For example, the method can include providing a selection of possible customization and corresponding partial search results or preliminary search results. Typically, it is preferred that the data regarding the partial search results or preliminary search results is in the form of differences compared to the unamended search strategy. Surprisingly, it was noted that it is quite easy to provide corresponding suggestions of relating quantifiers while the search strategy benefits significantly from some quick manual review from a technical expert giving an indication whether the corresponding quantifier is apparently correct or potentially defective.

According to further embodiments it is preferred that the method utilizes a reinforced learning strategy to provide a search strategy. Herein, the data provided to the user interface can contain data regarding the search strategy, preliminary search results or even suggestions to optimize the search strategy to the user interface to be reviewed by a user. For example, it was beneficial for typical embodiments to provide a combination of partial search result or preliminary search result in combination with suggestions of potentially beneficial amendments. Surprisingly, it was noted that users skilled in the technical context of the database like especially in the field of continuous flow engines are able to provide evaluations with regard to the quality of the search strategy with a very high reliability using such information. Simultaneously, they can beneficially select from a plurality of suggested potential customizations to see whether this improves the search strategy, wherein typically a new partial search result or preliminary search result is provided to the user interface based on the customized search strategy.

According to a further aspect the present invention refers to a system comprising a processor and a non-transitory computer readable medium comprising computer executable instructions that when executed by the processor cause the system to perform operations comprising: receiving instructions from a user interface, retrieving data from a database by means of a search interface, wherein the database contains a plurality of datasets and a plurality of relationships of the datasets, wherein the search interface is based on graph query language, and wherein the system is adapted to process instructions entered in the user interface being at least partially not in graph query language and/or to process data retrieved from the database being in graph query language, preferably including converting at least a part of the instructions being not in graph query language into graph query language and/or converting at least a part of the data retrieved from the database being in graph query language into a different format. Utilizing such system for the inventive method allows to easily improve the quality and reduce the time required to perform valuable searches in available databases as, for example, available for continuous flow engines. Providing, for example, a fixed solution specifically adapted for such purpose further simplifies such application and allows to easily implement the inventive method also in smaller sized industrial plants that simply connect the inventive system to some internal database containing the stored up data.

The product and methods described herein may be embodied by a computer program product or a plurality of computer program products, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

According to further aspect the present invention refers to a computer program product, tangibly embodied in a machine-readable storage medium, including instructions operable to cause a computing entity to execute an inventive method.

The term "computer" refers to any electronic device comprising a processor, such as a general-purpose central processing unit (CPU), a specific purpose processor or a microcontroller. The processor is adapted to execute a special computing task. A computer is capable of receiving data (an input), of performing a sequence of predetermined operations thereupon, and of producing thereby a result in the form of data or signals (an output). Depending on context, the term "computer" will mean either a processor in particular or can refer more generally to a processor in association with an assemblage of interrelated elements contained within a single case or housing.

The computer program product may be processed in a distributed manner, such as that certain steps are performed on a first computing entity (e.g. at the turbine) and that other steps are performed on a second computing entity (e.g. on a central server).

The computer program product may be offered, placed on market, used, imported and/or stored as (and thus may be part of) a computer program product. Thus, the computer program product may be provided on a storage medium (computer readable medium, like a computer disc or a memory stick etc.). Alternatively, the computer program product may be provided via download by means of a respective network connection to a server, which stores the computer program product by providing a link to the server with the computer program product stored thereon. A "computer-readable medium" or "storage medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

The computer program product according to further embodiments is adapted to execute the embodiments of the inventive method and the embodiments of the inventive system. In this context, it has to be understood that each single or a combination of the specific embodiments as described above can be utilized to modify the computer program product as specified.

According to further embodiments it is preferred that the computer program product contains a learning mechanism, wherein the learning mechanism reviews prior searches and customizations entered by means of the user interface to provide improved suggestions like filter options, quantifiers or actions available when providing data to the user interface. For example, such learning mechanism can be based on some artificial intelligence. Herein, corresponding relationships can be based on technical aspects to provide comparable amendments at a higher priority or automatically based on reviewing past searches and big data analysis to extrapolate potentially relevant data. This allows to automatically make good use of the tremendous amount of experience of the user being a technical expert continuously using the data structure product being also available for different users as well as future generation users.

According to further embodiments the computer program product contains an interpretation mechanism, wherein the interpretation mechanism is adapted to build up an internal dictionary for translating instructions like natural language entered in the user interface. It was noted, that is surprisingly highly beneficial to adapt the computer program product to the specific vocabulary of users being technical experts to minimize their effort to enter a correct customization. Based on the significant difference of the terminology of technical experts and data analytics experts a significant rate of misunderstandings seems to result from a different type of wording used and understood differently by these groups. Such interpretation mechanism can, for example, be built up over time utilizing the amendments of customizations entered by the user using a user interface and being amended again later on. Surprisingly, creating such dictionary requires little effort and works well. It is assumed that despite the difference in the vocabulary utilized the mindset is surprisingly similar and results is some basic translation of specific terms significantly increasing the chance of a correct interpretation. Also, such interpretation mechanism can be programmed in advance based on certain test cases and a cooperation of technical experts and data analytics experts. It was noted, that for many cases it is highly beneficial to combine an automated and planned process to provide such interpretation mechanism.

According to further embodiments it is preferred that the computer program product is adapted to provide an accuracy dataset, wherein the accuracy dataset is calculated by measuring a difference between values of a technical device being topic of the search and corresponding values of comparable technical devices contained in the datasets. For example, such technical device can be a continuous flow engine or a compressor, more preferred a continuous flow engine. This allows to, for example, provide corresponding accuracy datasets containing information otherwise not being available for the user being a technical expert. Such easy to interpret additional information allows the user, for example, to more easily understand why a specific dataset was not included in the search strategy preventing him from forcibly including it again or to select from a number of datasets the most reliable one.

According to further embodiments it is preferred that the computer program product creates a selection a filter options, preferably by selecting from available predetermined filter options, and the data provided to the user interface contains the selection of filter options. Typically, it is preferred that the computer program product is adapted to provide suggestions of different filter options for at least two datasets of the database. This enables to gain insight into such searches very easy and additionally instantly provides some good results motivating user. Furthermore, it surprisingly also simplifies the work for experienced users that already collected quite some experience within the data analytics field.

According to further embodiments it is preferred that the computer program product utilizes a reinforced learning mechanism to provide a search strategy. Herein, the computer program product can be utilized to provide data regarding the search strategy, preliminary search results or even suggestions to optimize the search strategy to the user interface to be reviewed by a user. For example, it was beneficial for typical embodiments to provide a combination of partial search result or preliminary search result in combination with suggestions of potentially beneficial amendments. Surprisingly, it was noted that users skilled in the technical field like especially in the field of continuous flow engines and compressors, especially continuous flow engines, are able to provide evaluations with regard to the quality of the search strategy with a very high reliability using such information. Simultaneously, they can beneficially select from a plurality of suggested potential customizations to see whether they improve the search strategy. Typically, it is preferred that a new partial search result or preliminary search result is provided to the user interface based on the customized search strategy thereafter.

According to further embodiments it is preferred that the computer program product retrieves technical data relating to, preferably contained in, the plurality of datasets and/or the plurality of relationships from the database or a further database, and provides the technical data to the user interface. Typically, it is preferred that such data being provided to the user interface is adapted to be utilized by the user, preferably a user lacking knowledge in graphic query language, to review and/or customize the search strategy. This allows to make best use of the available know how and reduces or even avoids less productive discussions rendering experts in graphic query language to mere translators sitting beside a technical expert to explain and formulate the graph query language input.

According to further aspect the present invention refers to a storage device for providing an inventive computer program product, wherein the device stores the computer program product and/or provides the computer program product for further use.

According to further aspect the present invention refers to a use of an inventive method, an inventive system, or an inventive computer program product to provide a search strategy within a database, wherein the database contains a plurality of datasets and a plurality of relationships of the datasets, and wherein the database provides a search interface based on graph query language.

According to further embodiments it is preferred that the search strategy is executed in the database being a knowledge graph. Surprisingly, it is surprisingly easy to implement the invention for such databases, wherein significantly improved results are obtained.

The following detailed description of the FIGURE uses the FIGURE to discuss illustrative embodiments, which are not to be construed as restrictive, along with the features and further advantages thereof.

FIG. 1 shows a scheme of an inventive system using an inventive method and an inventive computer program product. Herein, a computer program product 2 is utilized to realize an inventive method. The computer program product 2 receives instructions from the user interface 1 as well as sends data to said user interface 1. The user interface enables a user 5 to review the data being visualized on the screen and select suggestions and details contained within the data provided. During this interaction the step of sending instructions to the computer program product 2 as well as providing data to the user interface 1 is repeated several times. Herein, a search strategy is refined step-by-step, wherein the user requests more detailed information and suggestions regarding possible filter options and datasets to be quantified from the computer program product 2. On the other hand, the computer program product 2 provides the requested data on demand as well as includes suggestions based on a learning mechanism taking into account prior searches.

The learning mechanism utilizes the data storage 7 containing data collected during prior searches and continuously storing new searches, search strategies, instructions received by the user interface, and customizations in the end being introduced in the search strategy. It is possible to provide such learning mechanism independent from the computer program product 2 leaving the interaction between the computer program product 2 and the data storage 7 being reduced to a request of corresponding suggestions and data. However, the embodiment shown in FIG. 1 includes such learning mechanism in the computer program product 2 itself.

The computer program product 2 furthermore converts the instructions received from the user interface 1 at least in part into a graph query language. This is required to utilize the search interface 3 connecting the computer program product 2 the database 4 being a knowledge graph, as the search interface 3 is based on graph query language. It was noted that graph query language is a highly efficient language to formulate searches inside databases like being available for continuous flow engines or compressors, especially continuous flow engines. However, it was noted that a user 5 being a technical expert is confronted with significant challenges to enter instructions utilizing such language. Typically, it is required that such expert is first intensively trained in this matter to utilize such language. It was noted that highly qualified experts typically have no time to acquire corresponding trainings resulting in the requirement that they are required to closely work together with an expert for data analytics to utilize a search strategy utilizing graph query language. This significantly reduces the efficiency of the overall process leading to the problem that the available possibilities are neglected and less efficient data retrieving methods are typically implemented.

The inventive method solves this problem being especially beneficial for areas like continuous flow engines providing a huge amount of data in databases containing a plurality of datasets and a plurality of relationships of such datasets. Herein, at least a part of the instructions is converted into a graph query language and/or data retrieved from the database 4 being in graph query language is processed to enable an easy understanding for users 5 being technical experts avoiding the requirement of extensive trainings.

To further simplify the search for the user 5 the computer program product 2 also provides the plurality of filter options to the user interface 1, wherein, for example, one option refers to the type of continuous flow engine. This allows to, for example, easily select datasets regarding comparable continuous flow engines. For example, the search itself might be related to an evaluation referring to the maintenance schedule and how the corresponding maintenance plan should be scheduled to provide maximum security and efficiency. Herein, the search might relate to a gas turbine type A, which however lacks enough data to make a reasonable assessment. However, the user 5 being an expert in this technical field is aware that a gas turbine of type B is identical or at least similar enough with regard to the component in question to make assessments based on corresponding data. Thus, he can request corresponding datasets from the database 4 in a very simple manner utilizing the inventive computer program 2 to review the available data within the database 4. In case he considers the data being satisfactory based on the information provided to the user interface 1 in response to his instructions before, he verifies that the search strategy should be amended in this way. In the following the search strategy can be utilized to provide the data required to simulate the real-time behavior of the gas turbine of type A to provide an optimized maintenance schedule.

The computer program product 2 is flexible and allows to retrieve required data from such databases 4 without any knowledge of graph query language. For example, it allows to retrieve data with regard to nodes, the relationships, quantifiers, instant counts, hierarchies, epistemic concepts, and/or instances in the database utilizing requests phrased in natural language. In addition hereto the computer program product processes the plurality of datasets and the plurality of relationships to provide summarized information. This summarized information is provided on demand to the user interface 1 to enable the user gaining insight in the structure of the database 4. Also, it is possible to retrieve data with regard to the creation and/or modeling effort and review it on the user interface 1. Surprisingly, it was noted that even technical experts having no experience with corresponding data analytics before are able to utilize corresponding data based on the very simple and intuitive approach of the inventive method and computer program product.

Furthermore, the computer program product 2 can provide a non-language representation of data contained in the database 4. In this context, the computer program product 2, for example, identifies similar datasets and relationships, groups corresponding sets of datasets and set of relationships and provides a scheme. This scheme represents a simplified landscape of the datasets and relationships and allows the user 5 to select groups of datasets to, for example, include them, exclude them and/or attach quantifiers to them. Additionally, the user 5 can select a type of relationship resulting in identical or similar relationships being highlighted in the scheme. Furthermore, the computer program product 2 can be instructed to simultaneously provide a search term phrased in graph query language and its explanation in natural language besides the selected action based on the non-language representation. This results in a very fast learning process for most users easily picking up basics of graph query language, for example, enabling them to understand terms of a search strategy phrased in graph query language. For advanced users 5 of the inventive method it, thus, typically becomes possible to provide a more detailed insight in the search strategy. Such advanced insight provided by the computer program product 2 can be turned on and off as demanded.

Furthermore, it was noted that the users 5 beneficially utilize partial search results and/or preliminary search results they request from the computer program product 2. In fact, is not only possible to take a quick look whether the search strategy already seems to fulfill their demands. It furthermore provides the chance for such user 5 to acquire an intuitive insight how the system behaves and how to achieve certain effects. Surprisingly, it was noted that this resulted in a significantly faster adaption of the inventive system and knowledge in this context that has not been achieved even using conventional training methods.

The computer program product 2 in addition to the actions as described above also assigns quantifiers as required to datasets and/or relationships. In case of the embodiment as shown in FIG. 1 the assignment of the quantifiers is based on data of prior searches as stored in the data storage 7. The suggested quantifiers are provided for the user 5 to the user interface 1 for review. Herein, the user 5 can easily verify or change the quantifier as it seems fit. He can also reduce the quantifier below a predefined threshold value to let certain datasets being excluded from the current search strategy. After receiving the instructions from the user interface 1 the quantifiers are updated by the computer program product 2 and utilized to provide the search strategy.

The embodiment shown in FIG. 1 furthermore provides the possibility that the computer program product 2 retrieves data from the database 6 containing technical data referring to the datasets of database 4 as specific technical data is in this case not included in database 4. This allows to also retrieve data from the database 4 based on technical details only available in database 6. Herein, for example, the computer program product 2 receives instructions to filter the datasets according to the technical feature A of gas turbine type A. However, the corresponding database does not contain the corresponding detailed information. However, it contains the relationship that feature A of gas turbine A can be provided by component type A. Taking this into account it automatically retrieves from database 6 details with regard to component type A and checks whether the specific components of type A contained in the gas turbine A provide the feature A. As additional verification or in case the computer program product 2 does not reach a certain level of security the corresponding data is provided to the user interface 1 to question whether it fulfills the requested parameters.

The scope of protection of the present invention is specified by the appended claims and is not restricted by the features explained in the description or shown in the drawing.

The invention claimed is:

1. A method of providing a search strategy within a database, wherein the method comprises:

receiving instructions from a user interface and providing data to the user interface, exchanging data between the user interface and the database via a search interface based on graph query language, wherein the database contains a plurality of datasets and a plurality of relationships of the datasets, calculating an accuracy dataset by measuring a difference between values of a technical device being a topic of a search and corresponding values of comparable technical devices contained in the datasets, wherein data provided to the user interface comprises the accuracy dataset and/or wherein the accuracy dataset is utilized to provide suggestions of potentially relevant datasets and/or relationships, and processing the instructions received from the user interface being not in graph query language into being in the graph query language; and wherein the datasets contain data regarding chemical plants, power plants, continuous flow engines and/or compressors;

wherein the accuracy dataset is utilized to provide suggestions of potentially relevant datasets and/or relationships;

wherein the plurality of datasets comprise time series data, measured by a sensor, of the technical device being the topic of the search and of the comparable technical devices such that the difference of the accuracy dataset is calculated by measuring a difference between the values of the time series data of the technical device being the topic of the search and the corresponding values of the time series data of the comparable technical devices; and wherein the time series data indicates data related to one or more of a physical component of the technical device and the comparable technical devices, a physical manufacturing of the technical device and the comparable technical devices, a physical use of the technical device and the comparable technical devices and a physical maintenance of the technical device and the comparable technical devices.

2. The method according to claim 1, further comprising:

processing at least a part of the data retrieved from database to provide summarized information of the plurality of datasets and/or the plurality of relationships, wherein the data provided to the user interface contains the summarized information; and wherein the summarized information is according to similar features shared by the plurality of datasets and/or the plurality of relationships and wherein the similar feature is identified automatically based on the received instructions from the user interface; and wherein the summarized information is based on the similar features that include a power output of the chemical plants, power plants, continuous flow engines and/or compressors, wherein the dataset of a specific range of the power output are summarized as a single set of datasets shown in the user interface.

3. The method according to claim 1, wherein the technical device and the corresponding technical devices are continuous flow engines; and wherein the physical component comprises one or more of a rotor, a blade or a vane.

4. A method of providing a search strategy within a database, wherein the method comprises:

receiving instructions from a user interface and providing data to the user interface, exchanging data between the user interface and the database via a search interface based on graph query language, wherein the database contains a plurality of datasets and a plurality of relationships of the datasets, calculating an accuracy dataset by measuring a difference between values of a technical device being a topic of a search and corresponding values of comparable technical devices contained in the datasets, wherein data provided to the user interface comprises the accuracy dataset and/or wherein the accuracy dataset is utilized to provide suggestions of potentially relevant datasets and/or relationships, processing the instructions received from the user interface being not in graph query language into being in the graph query language;

evaluating, based on the calculated accuracy dataset, a first dataset of the plurality of datasets comprising a first type of technical devices based on the measured difference between the values of the technical device being the topic of the search and the corresponding values of the first type of technical devices in the first dataset;

evaluating, based on the calculated accuracy dataset, a second dataset of the plurality of datasets comprising a second type of technical devices based on the measured difference between the values of the technical device being the topic of the search and the corresponding values of the second type of technical devices in the second dataset; and providing the suggestions to the user interface that the first database is one of the potentially relevant datasets and that the second database is not one of the potentially relevant datasets, based on the evaluating steps;

wherein the datasets contain data regarding chemical plants, power plants, continuous flow engines and/or compressors.

5. The method according to claim 1, further comprising:

assigning at least one quantifier to a dataset and/or a relationship, and providing a partial search result, a step of the search result, a preliminary search result and/or a search result based on the at least one assigned quantifier.

6. The method according to claim 1, further comprising:

visualizing technical data regarding the datasets and/or relationships in the user interface.

7. The method according to claim 1, further comprising:

processing at least a part of the plurality of datasets and/or the plurality of relationships of the database to provide a non-language representation of the at least part of the data to the user interface, and providing the non-language representation to the user interface, wherein the instructions are at least in part, or completely, based on the non-language representation of data of the database.

8. The method according to claim 1, wherein the plurality of datasets in the database comprise the time series data representing data collected over years and results in amounts of data for the same chemical plants, power plants, continuous flow engines and/or compressors being inhomogeneous based on changes over time due to a sensor being replaced or a part of the chemical plants, power plants, continuous flow engines and/or compressors being replaced over time.

9. A system comprising:

a processor, and a non-transitory computer readable medium comprising computer executable instructions that when executed by the processor cause the system to perform operations comprising:

receiving instructions from a user interface, retrieving data from a database via a search interface, wherein the database contains a plurality of datasets and a plurality of relationships of the datasets, calculating an accuracy dataset by measuring a difference between values of a technical device being a topic of a search and corresponding values of comparable technical devices contained in the datasets, wherein data provided to the user interface comprises the accuracy dataset and/or wherein the accuracy dataset is utilized to provide suggestions of potentially relevant datasets and/or relationships, wherein the search interface is based on graph query language, and wherein the system is adapted to process instructions entered in the user interface being not in graph query language into being in the graph query language; and wherein the datasets contain data regarding chemical plants, power plants, continuous flow engines and/or compressors wherein the accuracy dataset is utilized to provide suggestions of potentially relevant datasets and/or relationships;

wherein the plurality of datasets comprise time series data, measured by a sensor, of the technical device being the topic of the search and time series data of the comparable technical devices such that the difference of the accuracy dataset is calculated by measuring a difference between the values of the time series data of the technical device being the topic of the search and the corresponding values of the time series data of the comparable technical devices; and wherein the time series data indicates data related to one or more of a physical component of the technical device and the comparable technical devices, a physical manufacturing of the technical device and the comparable technical devices, a physical use of the technical device and the comparable technical devices and a physical maintenance of the technical device and the comparable technical devices.

10. A computer program product, tangibly embodied in a non-transitory machine-readable storage medium, comprising:

instructions operable to cause a computing entity to execute a method according to claim 1.

11. A storage device, comprising:

a computer program product according to claim 10 stored thereon.

12. The method according to claim 1, further comprising:

converting at least a part of the instructions from the user interface being not in graph query language into graph query language in order to exchange data with the database, and/or converting at least a part of the data retrieved from the database being in graph query language into a different format to provide data to the user interface.

13. The method according to claim 4, wherein the plurality of datasets comprise time series data of the technical device being the topic of the search and time series data of the comparable technical devices such that the difference of the accuracy dataset is calculated by measuring a difference measured between the values of the time series data of the technical device being the topic of the search and the corresponding values of the time series data of the comparable technical devices;

wherein the time series data is measured by a sensor of the technical device and the comparable technical devices; and wherein the time series data indicates data related to one or more of a physical component of the technical device and the comparable technical devices, a physical manufacturing of the technical device and the comparable technical devices, a physical use of the technical device and the comparable technical devices and a physical maintenance of the technical device and the comparable technical devices.

14. The system of claim 9, further comprising:

converting at least a part of the instructions being not in graph query language into graph query language, and/or converting at least a part of the data retrieved from the database being in graph query language into a different format.

15. The method according to claim 1, wherein the instructions entered in the user interface are in natural language and wherein the system is adapted to process data retrieved from the database being in graph query language to not in the graph query language.

16. The method according to claim 1, further comprising:

providing a non-language representation of data contained the database including;

identifying similar datasets among the plurality of datasets and similar relationships among the plurality of relationships, providing a scheme that represents a simplified landscape of the plurality of datasets and the plurality of relationships, and receiving instructions from the user interface of a selection of a group of datasets and/or a group of relationships based on the provided scheme.

17. The method according to claim 1, further comprising simultaneously providing at the user interface a search term phrased in the graph query language and an explanation in natural language of the search term as part of a learning process for graph query language that enables a user to understand the search term in graph query language.

18. A method of providing a search strategy within a database, wherein the method comprises:

receiving instructions from a user interface and providing data to the user interface, exchanging data between the user interface and the database via a search interface based on graph query language, wherein the database contains a plurality of datasets and a plurality of relationships of the datasets, utilizing an accuracy dataset, wherein the accuracy dataset is calculated by measuring a difference between values of a technical device being a topic of a search and corresponding values of comparable technical devices contained in the datasets, wherein data provided to the user interface comprises the accuracy dataset and wherein the accuracy dataset is utilized to provide suggestions of potentially relevant datasets and/or relationships, processing the instructions received from the user interface being not in graph query language into being in the graph query language;

processing the plurality of datasets and/or the plurality of relationships of the database to provide a non-language representation of the data to the user interface, providing the non-language representation to the user interface, and simultaneously providing at the user interface a search term phrased in the graph query language and an explanation in natural language of the search term as part of a learning process for graph query language that enables a user to understand the search term in graph query language;

wherein the instructions are based on the non-language representation of data of the database;

wherein the instructions entered in the user interface are in natural language and wherein the system is adapted to process data retrieved from the database being in graph query language to be at least partially not in the graph query language; and wherein the datasets contain data regarding chemical plants, power plants, continuous flow engines and/or compressors; and wherein the simultaneously providing step results in the learning process for the user to pick up basics of graph query language including enabling the user to understand terms of a search strategy phrased in graph query language.

19. The method according to claim 18, wherein the accuracy dataset is utilized to provide suggestions of potentially relevant datasets or relationships; and wherein the plurality of datasets comprise time series data of the technical device being the topic of the search and time series data of the comparable technical devices such that the difference of the accuracy dataset is calculated by measuring a difference between the values of the time series data of the technical device being the topic of the search and the corresponding values of the time series data of the comparable technical devices.

20. The method according to claim 19, wherein the time series data is measured by a sensor of the technical device and the comparable technical devices; and wherein the time series data indicates data related to one or more of a physical component of the technical device and the comparable technical devices, a physical manufacturing of the technical device and the comparable technical devices, a physical use of the technical device and the comparable technical devices and a physical maintenance of the technical device and the comparable technical devices.

* * * * *